US012586262B1

(12) United States Patent
Asselin et al.

(10) Patent No.: US 12,586,262 B1
(45) Date of Patent: Mar. 24, 2026

(54) GEOGRAPHICALLY GUIDED GENERATION OF REALISTIC 2D RENDERS OF 3D INFRASTRUCTURE MODELS

(71) Applicant: Bentley Systems, Incorporated, Exton, PA (US)

(72) Inventors: Louis-Philippe Asselin, Quebec (CA); Andre Villemaire, Quebec (CA)

(73) Assignee: Bentley Systems, Incorporated, Exton, PA (US)

( * ) Notice: Subject to any disclaimer, the term of this patent is extended or adjusted under 35 U.S.C. 154(b) by 180 days.

(21) Appl. No.: 18/628,324

(22) Filed: Apr. 5, 2024

(51) Int. Cl.
| | |
|---|---|
| *G06T 11/00* | (2006.01) |
| *G06T 5/70* | (2024.01) |
| *G06T 7/73* | (2017.01) |
| *G06T 17/00* | (2006.01) |

(52) U.S. Cl.
CPC ............... *G06T 11/00* (2013.01); *G06T 5/70* (2024.01); *G06T 7/73* (2017.01); *G06T 17/00* (2013.01); *G06T 2207/20081* (2013.01); *G06T 2207/20092* (2013.01); *G06T 2207/30181* (2013.01)

(58) Field of Classification Search
CPC ... G06T 11/00; G06T 5/70; G06T 7/73; G06T 17/00; G06T 2207/20081; G06T 2207/20092; G06T 2207/30181
See application file for complete search history.

(56) References Cited

U.S. PATENT DOCUMENTS

| | | | | |
|---|---|---|---|---|
| 2017/0116723 A1* | 4/2017 | Aughey | .................... | G06T 7/70 |
| 2018/0374249 A1* | 12/2018 | Colbert | ................ | G06F 18/214 |

| | | | | |
|---|---|---|---|---|
| 2019/0295302 A1 | 9/2019 | Fu et al. | | |
| 2021/0383242 A1 | 12/2021 | Ostyakov et al. | | |
| 2022/0124257 A1* | 4/2022 | Zhao | ...................... | H04N 5/265 |
| 2022/0254071 A1* | 8/2022 | Ojha | ...................... | G06N 3/045 |
| 2022/0358360 A1 | 11/2022 | Asselin et al. | | |

(Continued)

OTHER PUBLICATIONS

Almahairi, Amjad, et al., "Augmented CycleGAN: Learning Many-to-Many Mappings from Unpaired Data," Proceedings of the 35th International Conference on Machine Learning, Stockholm, Sweden, PMLR 80, vol. 80, Jul. 10-15, 2018, pp. 1-10.

(Continued)

*Primary Examiner* — Maurice L. Mcdowell, Jr.

(74) *Attorney, Agent, or Firm* — Cesari and McKenna, LLP; James A. Blanchette

(57) ABSTRACT

In example embodiments, a visualization application uses geographically relevant style images as guidance to automatically generate realistic 2D renders of a 3D infrastructure model. The application generates a synthetic render of the 3D infrastructure model and retrieves a set of style images that correspond to a geographics position associated with the model. The synthetic 2D render, the set of style images and, optionally, one or more user-provided text guidance phrases and/or mask images are applied to a realistic 2D render generator of the application. The realistic 2D render generator performs image translation (guided by the optional text guidance phrases and/or mask images) to adjust visual appearance of the infrastructure in the synthetic 2D render based on the visual appearance of the set of style images and to generate realistic context based on what appears in the set of style images, thereby producing a realistic 2D render.

23 Claims, 9 Drawing Sheets

(56) References Cited

U.S. PATENT DOCUMENTS

| | | | |
|---|---|---|---|
| 2023/0076809 A1* | 3/2023 | Chaudhary | .......... A61B 6/5217 |
| 2023/0360362 A1* | 11/2023 | Tomar | .................. G06V 10/443 |

OTHER PUBLICATIONS

"ContextCapture: User Guide," Bentley, Bentley Systems, Incorporated, Apr. 9, 2021, pp. 1-275.

Li, Yijun, et al., "A Closed-form Solution to Photorealistic Image Stylization," Computer Vision Foundation, CVF, SpringerLink, Oct. 7, 2018, pp. 1-16.

Radford, Alec, et al., "Learning Transferable Visual Models From Natural Language Supervision," arXiv, arXiv:2103.00020v1 [cs. CV], Feb. 26, 2021, pp. 1-47.

Rao, Kanishka, et al., "RL-CycleGAN: Reinforcement Learning Aware Simulation-To-Real," IEEE, 2020 IEEE/CVF Conference on Computer Vision and Platform Recognition (CVPR), Seattle, WA, USA, Jun. 13-19, 2020, pp. 11151-11163.

Tumanyan, Narek, et al., "Splicing ViT Features for Semantic Appearance Transfer," Computer Vision Foundation, CVF, IEEE Xplore, 2022 IEEE/CVF Conference on Computer Vision and Pattern Recognition (CVPR), New Orleans, LA, USA, Jun. 18-24, 2022, pp. 10748-10757.

Zhu, Jun-Yan, et al., "Unpaired Image-to-Image Translation Using Cycle-Consistent Adversarial Networks," arXiv, arXiv:1703. 10593v7 [cs.CV], Aug. 24, 2020, pp. 1-18.

* cited by examiner

100

USER
INTERFACE
120

CLOUD-BASED
SOFTWARE 112

VIEW SELECTOR
125

3D VIEWER
130

AUTOMATIC STYLE
IMAGE RETRIEVER
140

REALISTIC 2D
RENDER GENERATOR 150

REVERSE DIFFUSION ML MODEL
155

DENOISING ML MODEL 160

IMAGE QUALITY
DISCRIMINATOR
165

MATERIAL AND/OR
TEXTURE
DETERMINER
175

ELEMENT MAPPER
170

3D INFRASTRUCTURE
MODEL UPDATER
180

600

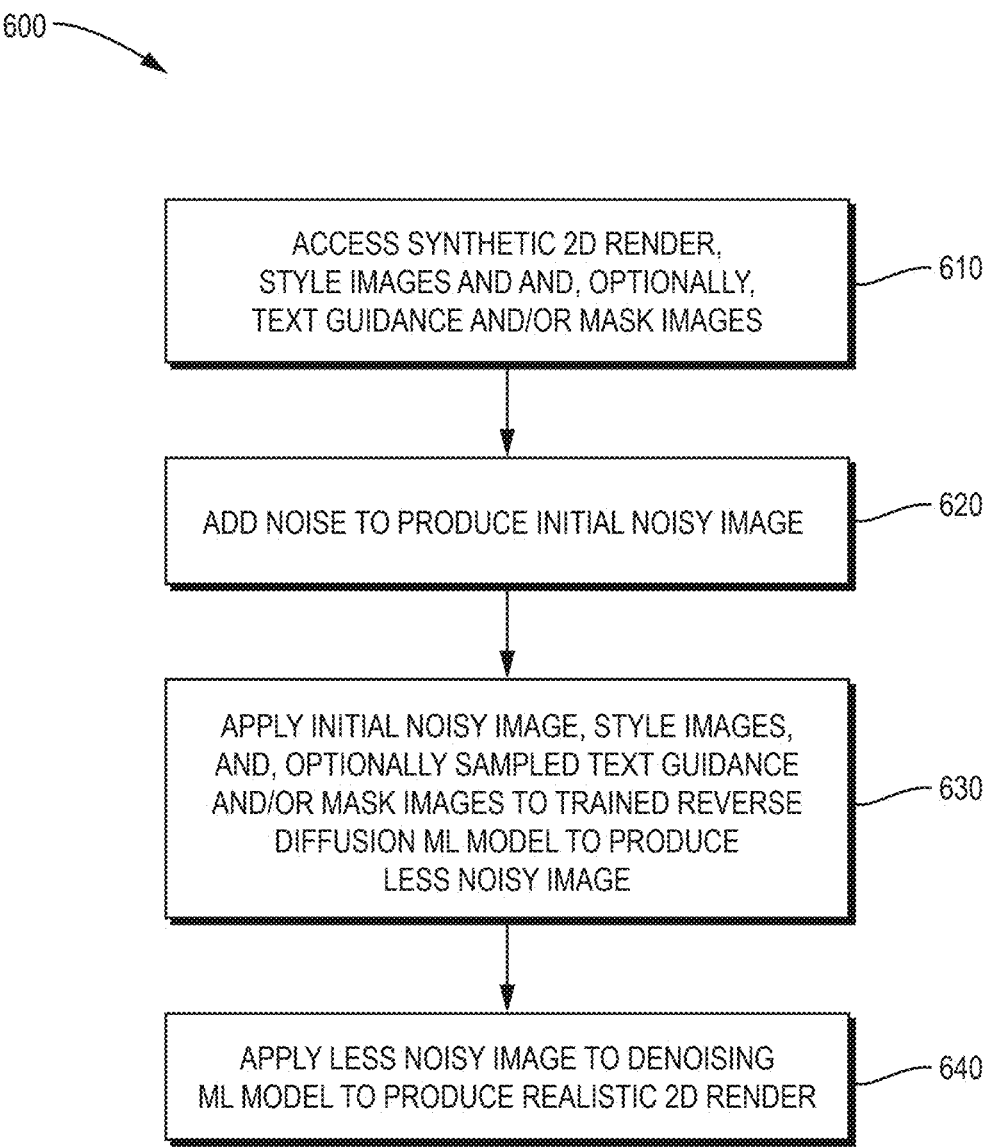

ACCESS SYNTHETIC 2D RENDER, STYLE IMAGES AND AND, OPTIONALLY, TEXT GUIDANCE AND/OR MASK IMAGES — 610

ADD NOISE TO PRODUCE INITIAL NOISY IMAGE — 620

APPLY INITIAL NOISY IMAGE, STYLE IMAGES, AND, OPTIONALLY SAMPLED TEXT GUIDANCE AND/OR MASK IMAGES TO TRAINED REVERSE DIFFUSION ML MODEL TO PRODUCE LESS NOISY IMAGE — 630

APPLY LESS NOISY IMAGE TO DENOISING ML MODEL TO PRODUCE REALISTIC 2D RENDER — 640

FIG. 6

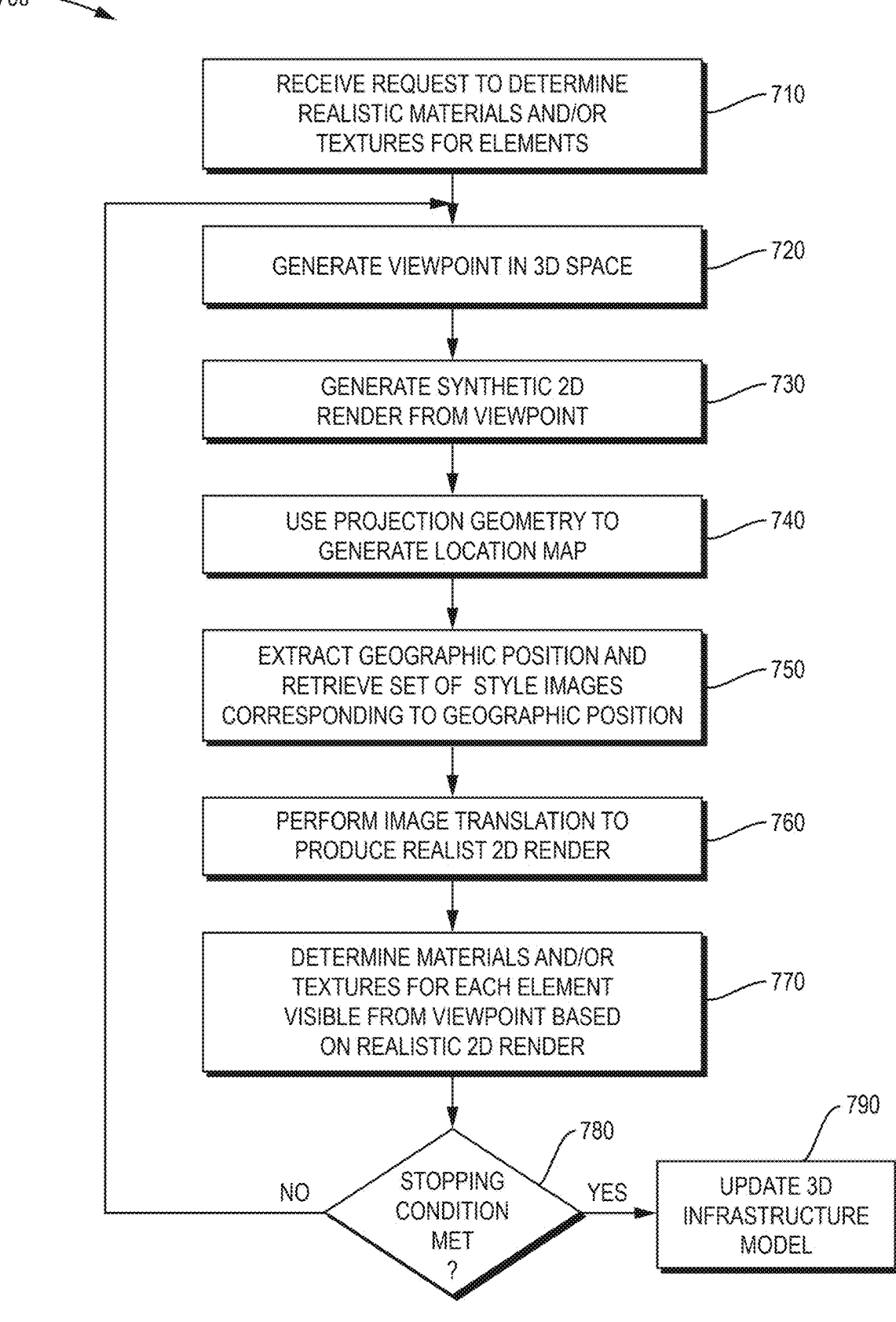

700

RECEIVE REQUEST TO DETERMINE
REALISTIC MATERIALS AND/OR
TEXTURES FOR ELEMENTS — 710

GENERATE VIEWPOINT IN 3D SPACE — 720

GENERATE SYNTHETIC 2D
RENDER FROM VIEWPOINT — 730

USE PROJECTION GEOMETRY TO
GENERATE LOCATION MAP — 740

EXTRACT GEOGRAPHIC POSITION AND
RETRIEVE SET OF STYLE IMAGES
CORRESPONDING TO GEOGRAPHIC POSITION — 750

PERFORM IMAGE TRANSLATION TO
PRODUCE REALIST 2D RENDER — 760

DETERMINE MATERIALS AND/OR
TEXTURES FOR EACH ELEMENT
VISIBLE FROM VIEWPOINT BASED
ON REALISTIC 2D RENDER — 770

780

STOPPING
CONDITION
MET
?

NO

YES

UPDATE 3D
INFRASTRUCTURE
MODEL — 790

FIG. 7

GEOGRAPHICALLY GUIDED GENERATION OF REALISTIC 2D RENDERS OF 3D INFRASTRUCTURE MODELS

BACKGROUND

Technical Field

The present disclosure relates generally to rendering computer aided design (CAD) models and more specifically to techniques for generating realistic two-dimensional (2D) renders of three-dimensional (3D) infrastructure models and related issues.

Background Information

Infrastructure typically refers to structures and facilities needed for the operation of an organization, company, community, country, or other entity, such as buildings, factories, plants, roads, railways, utility networks, and the like. As part of the design, construction and/or operation of infrastructure, it is often desirable to create 3D infrastructure models. As used herein, the term "3D infrastructure model" refers to a 3D computer aided design (CAD) model of infrastructure. A 3D infrastructure model may be a built infrastructure model (BIM). A BIM is a digital representation of infrastructure as it should be built, providing a mechanism for visualization and collaboration. A 3D infrastructure model is typically composed of a number of individual elements. As used herein, the term "element" refers to a record that represents (i.e., "models," in a colloquial sense of the term) an individual entity within a 3D infrastructure model. Elements may be represented using geometric primitives and metadata.

It is often desirable to generate a 2D render (e.g., a realistic 2D render) of a 3D infrastructure model, for example, to show how infrastructure will appear after it has been built. Preferably, a realistic 2D render should not only show the infrastructure itself with realistic visual appearance but also show realistic context for the infrastructure. As used herein, the term "realistic 2D render" refers to a substantially photo-realistic 2D render that approximates reality. A realistic 2D render is contrasted with a "synthetic 2D render", which refers to a 2D render that represents information using abstracted indicia such that the resulting visual appearance differs substantially from that found in nature. While informative, a synthetic 2D render provides an artificial or "computer-generated appearance." As used herein, the term "material" refers to optical properties of an element including its base color and reflectance (e.g., whether incident light is reflected in a diffuse manner providing a matte appearance or in a specular manner providing a glossy appearance). As used herein, the term "texture" refers to a patch of different colors (e.g., variations to a base color) that create a pattern that provides variation to a uniform appearance of a material. An example of a texture may be a wood grain texture or a brick texture. Textures are often represented by small images (e.g., 256×256 pixel bitmaps) that are repeated and stitched together to cover a surface. As used herein, the term "context" refers to nearby terrain, vegetation, and/or other structures that provide an indication of the surroundings and environment that infrastructure inhabits. Sometimes, context may be shown as a "background." As used herein, the term "background" refers to an image that is designed to be placed behind or about a render of infrastructure itself.

To generate a realistic 2D render of infrastructure itself, an infrastructure model and an appropriate set of rendering parameters (e.g., materials, textures, lighting parameters, atmospheric parameters, etc.) may be applied to a rendering engine (e.g., a ray tracing rendering engine). However, determining an appropriate set of rendering parameters may be quite involved. Often, this process is performed entirely manually and relies heavily on the artistic skill of the user. The user may be called upon to assign a material and texture to each surface of each element of a 3D infrastructure model. Often, indications of materials and textures are absent or incomplete in element metadata. Even if they are present, they may be artificial, following simple conventions or chosen for purposes of contrast or information presentation. To determine realistic materials and textures the user would typically need to make numerous artistic judgments. The user may also be called upon to place light sources and adjust related lighting parameters so that the result is natural looking, without over or under-exposure, to indicate atmospheric parameters indicating atmospheric conditions (e.g., smog, etc.), and to provide other rendering parameters. Again, the user is typically required to make numerous artistic judgments. In addition to this process being extremely tedious and time consuming, the quality of the result is heavily dependent on the user's individual artistic skill.

Similarly, generating realistic context to show around a 2D render of infrastructure is burdensome. Typically, 3D infrastructure models do not include information about such context (e.g., do not also model nearby terrain, vegetation, and/or structures). In some workflows, the user may be called upon to add contextual assets and/or a background to a 3D infrastructure model (e.g., identifying appropriate terrain, vegetation, and/or structures, obtaining or creating models for them, and placing them in appropriate locations, locating an appropriate background, and blending in the background). This may be extremely tedious and time consuming. In most cases, users will only add a minimum of contextual assets to save time, leading to a sparce and incomplete appearance. Further, like an infrastructure model itself, the realism of added context is typically heavily dependent on the individual skill of the user and their artistic judgments.

Some attempts have been made to streamline the generation of realistic context by using photogrammetry to build a 3D reality model. Rather than manually adding contextual assets and/or background, a user may travel to the site the infrastructure is to be located and capture a set of 2D images. These 2D images are then provided to photogrammetry software (e.g., ContextCapture software available from Bentley Systems Inc.). The photogrammetry software performs operations roughly divided into two stages: an automatic structure-from-motion (SfM) stage and a dense 3D reconstruction stage. The automatic SfM stage typically involves SfM techniques that compute camera parameters of each of the images and generates a low-density (i.e. sparse) 3D point cloud. The 3D reconstruction stage typically involves a dense 3D reconstruction that produces a polygon mesh from the sparse 3D point cloud and camera parameters and applies materials and textures to the polygon mesh, producing a 3D reality model. While such a technique may avoid some of the tedium of manually generating contextual assets and background, it is still burdensome and relies heavily on user skill. Capturing the necessary 2D images and generating the 3D reality model may be time consuming and consume significant computing resources (e.g., processing and memory resources). Further, combining a 3D reality model with a 3D infrastructure model so that they blend in a natural manner may require significant technical and artistic skill by the user.

Accordingly, there is a need for improved techniques for generating realistic 2D renders of 3D infrastructure models that require a minimum of manual user effort, artistic skill, and computing resources. Preferably, the techniques would be extendable to also address related issues in producing realistic 2D renders. For example, it would be desirable if the techniques could be extended to assign materials and/or textures to elements of a 3D infrastructure model itself.

SUMMARY

In various embodiments, a visualization application uses geographically relevant style images as guidance to automatically generate realistic 2D renders of a 3D infrastructure model with a minimum of manual user effort, artistic skill, and computing resources. A 3D viewer of the visualization application generates a synthetic render of the 3D infrastructure model from a user-selected or automatically-determined viewpoint in 3D space. An automatic style image retriever of the application retrieves a set of style images that correspond to a geographics position associated with the 3D infrastructure model. The style images are preferably geo-referenced photorealistic images that show terrain, vegetation, and/or structures near the geographic position, and provide information about visual appearance and context that may be applied to a synthetic 2D render. The automatic style image retriever may retrieve the style images from an existing image database (e.g., an online database such as the Google Images® database, Google Street View® database, Bing® Satellite Images database, etc.) and/or another source. The synthetic 2D render, the set of style images, and, optionally, one or more user-provided text guidance phrases and/or mask images are applied to a realistic 2D render generator of the application. The realistic 2D render generator uses a reverse diffusion machine learning (ML) model and a denoising ML model to perform image translation (guided by the optional text guidance phrases and/or mask images) to adjust visual appearance of the infrastructure in the synthetic 2D render based on the visual appearance of the set of style images and to generate realistic context based on what appears in the set of style images, thereby producing a realistic 2D render of the 3D infrastructure model.

In one extension of the techniques, realistic 2D renders produced using the techniques may be used to as a basis for assigning materials and/or textures to elements of a 3D infrastructure model itself. In such manner, absent, incomplete, or simply artificial-looking materials and/or textures indicated in element metadata may be replaced by realistic materials and/or textures.

More specifically, in one embodiment, a method is provided for generating a realistic 2D render of a 3D infrastructure model. A visualization application executing on one or more computing devices receives a request to generate the realistic 2D render of the 3D infrastructure model and generates a synthetic 2D render of the 3D infrastructure model from the viewpoint. The visualization application determines a geographic position for the 3D infrastructure model and retrieves a set of style images corresponding to the geographic position that show terrain, vegetation, and/or structures. The visualization application performs image translation to adjust visual appearance of infrastructure in the synthetic 2D render based on visual appearance of the set of style images and to generate realistic context based on what appears in the set of style images, to produce the realistic 2D render. The visualization application then outputs the realistic 2D render.

In another embodiment, a non-transitory computing device readable medium is provided. The medium has instructions stored thereon that when executed by one or more computing devices are operable to receive a request to generate a realistic 2D render of a 3D infrastructure model and determine a viewpoint in 3D space of the 3D infrastructure model. The instructions when executed are further operable to generate a synthetic 2D render of the 3D infrastructure model from the viewpoint. The instructions when executed are also operable to obtain a set of style images that show terrain, vegetation, and/or structures and perform image translation to adjust visual appearance of infrastructure in the synthetic 2D render based on visual appearance of the set of style images and to generate realistic context based on what appears in the set of style images, to produce the realistic 2D render. The instructions when executed are still further operable to output the realistic 2D render.

In yet another embodiment, a method is provided for assigning materials and/or textures to elements of a 3D infrastructure model. A visualization application executing one or more computing devices receives a request to determine realistic materials and/or textures for the 3D infrastructure model. The application determines a viewpoint in 3D space of the 3D infrastructure model. The application generates a synthetic 2D render of the 3D infrastructure model from the viewpoint and generates a location map that relates pixels in the synthetic 2D render to elements from which they were generated in the 3D infrastructure model. The application obtains a set of style images that show terrain, vegetation, and/or structures and performs image translation to adjust visual appearance of infrastructure in the synthetic 2D render based on visual appearance of the set of style images based on what appears in the set of style images to produce the realistic 2D render. The application determines realistic materials and/or textures for one or more elements of the 3D infrastructure model visible from the viewpoint based on the realistic 2D render and the location map and updates the 3D infrastructure model to add missing or replace initial materials and/or textures with the realistic materials and/or textures.

It should be understood that a wide variety of additional features and alternative embodiments may be implemented other than those discussed in this Summary. This Summary is intended simply as a brief introduction to the reader for the further description that follows and does not indicate or imply that the examples mentioned herein cover all aspects of the disclosure or are necessary or essential aspects of the disclosure.

BRIEF DESCRIPTION OF THE DRA WINGS

The description refers to the accompanying drawings of example embodiments, of which:

FIG. 6 is a flow diagram of an example sequence of steps for using a trained reverse diffusion ML model and denoising ML model of the realistic 2D render generator in inference to generate a realistic 2D render of a 3D infrastructure model; and FIG. 7 is a high-level sequence of steps that may be performed by the visualization application and its modules to assign materials and/or textures to elements of a 3D infrastructure model based on geographically relevant style images.

DETAILED DESCRIPTION

The following description describes example embodiments. Any references to items in the singular should be understood to include items in the plural, and vice versa, unless explicitly stated or otherwise clear from the context. Grammatical conjunctions are intended to express any and all disjunctive and conjunctive combinations of conjoined clauses, sentences, words, and the like, unless otherwise stated or clear from the context. For example, the term "or" should be understood to mean "and/or." Any recitations of ranges of values are not intended to be limiting, are provided as examples only, and are not intended to constitute a limitation on the scope of the described embodiments. Further, any recitation of ranges should be interpreted as referring individually to any and all values falling within the range, unless otherwise indicated, and each separate value within such the range should be treated as if it were individually recited. Terms of approximation such as "about," "approximately," "substantially" or the like, should be construed as referring to an allowance for deviation that is appreciated by one of ordinary skill in the art. Terms of relative ordering or orientation, such as "first," "last," "greatest", "lowest", "top," "bottom," and the like, should be understood to be used relative to a standard of comparison or perspective, and do not preclude differing orderings or orientations based on different standards of comparison or perspectives. No language in the description should be construed as indicating an element is a necessary or essential aspect of the disclosure.

Figure 1:
FIG. 1 is a high-level block diagram of an example visualization application that may use geographically-relevant style images as guidance to generate a realistic 2D render of a 3D infrastructure model.

FIG. 1 is a high-level block diagram of an example visualization application 100 that may use geographically-relevant style images as guidance to generate a realistic 2D render of a 3D infrastructure model. The visualization application 100 may be a stand-alone software application or a component of a larger software application, for example, a design and modeling software application. The software may be divided into local software 110 that includes modules that execute on one or more computing devices local to an end-user (collectively "local devices") and, in some cases, cloud-based software 112 that includes modules that execute on one or more computing devices remote from the end-user (collectively "cloud computing devices") accessible via a network (e.g., the Internet). Each computing device may include processors, memory/storage, a display screen, and other hardware (not shown) for executing software, storing data and/or displaying information.

In one embodiment, where the majority of more processing intensive operations take place in the cloud, the local software 110 may include one or more software modules, including a user interface 120 configured to receive input (e.g., selections of viewpoints, text guidance phrases, etc.) from the user and display generated realistic 2D renders. The cloud based software may include the remaining modules. In some embodiments, a viewpoint selector 125 may be configured to generate viewpoints. A 3D viewer 130 may be configured to generate synthetic 2D renders of a 3D infrastructure model for viewpoints. An automatic style image retriever 140 may be configured to retrieve a set of style images that correspond to a geographics position associated with a 3D infrastructure model that provide information about that show terrain, vegetation, and/or structures near the geographic position and provide information about visual appearance and context that may be applied to a synthetic 2D render. A realistic 2D render generator 150 may be configured to use a reverse diffusion ML model 155 and denoising ML model 160 to perform image translation to adjust visual appearance of infrastructure in a synthetic 2D render based on the visual appearance of a set of style images and to generate realistic context based on what appears in the set of style images. In some embodiments, an optional image quality discriminator 165 may include a ML model trained to evaluate a realistic 2D render and return a quality score indicating how visually pleasing it appears. Likewise, in some embodiments that extend the functionality of the techniques, a 2D render to element mapper 170, a material and/or texture determiner 175 and a 3D infrastructure model updater 180 may collectively be configured to assign materials and/or textures determined based on a realistic 2D render to surfaces of elements of a 3D infrastructure model.

Figure 2:
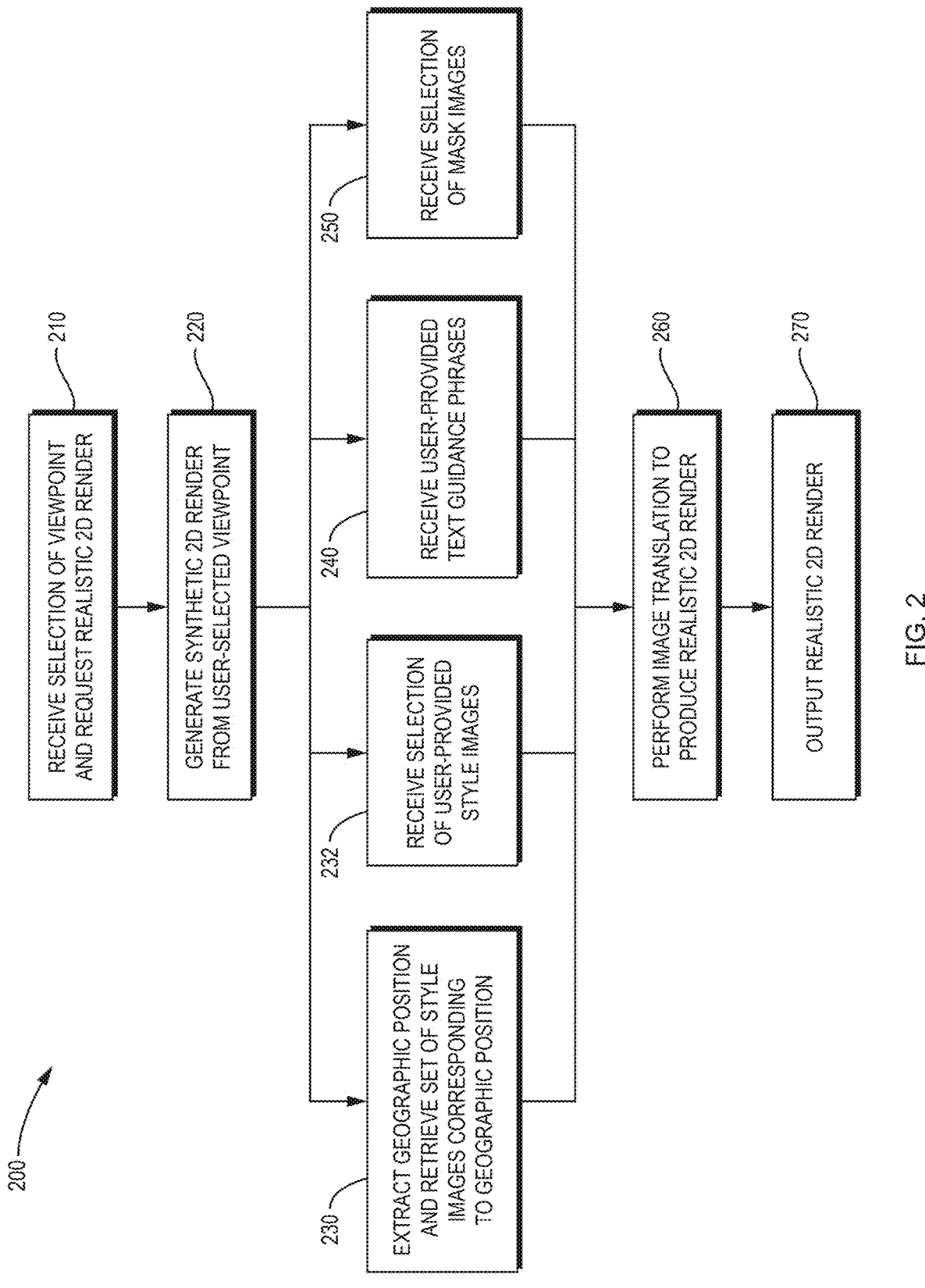
FIG. 2 is a high-level sequence of steps that may be performed by the visualization application and its modules to generate a realistic 2D render of a 3D infrastructure model.

FIG. 2 is a high-level sequence of steps 200 that may be performed by the visualization application 100 and its modules to generate a realistic 2D render of a 3D infrastructure model. The sequence of steps 200 may represent a user-directed workflow. At step 210, the user interface 120 of the visualization application 100 receives a selection of a viewpoint in 3D space from which to show the 3D infrastructure model and a request to generate a realistic 2D render. The viewpoint selection may be moving a virtual camera provided by the 3D viewer 130. The request to generate a realistic 2D render may be a button press.

At step 220, the 3D viewer 130 of the visualization application 100 generates a synthetic 2D render of the 3D infrastructure model for the user-selected viewpoint. In one embodiment, the synthetic 2D render may involve rendering each of the elements of the 3D infrastructure model in a single color with Lambertian reflectance. Alternatively, elements of the 3D infrastructure model may be rendered in multiple colors (e.g., based on class)

A depth map contains information describing the surfaces of elements visible in the synthetic 2D render and the viewpoint may be produced as part of the synthetic 2D render (e.g., as a channel thereof). The synthetic 2D render may be shown to the user by the user interface 120.

Figure 3A:
FIG. 3A is an example synthetic 2D render of an example 3D infrastructure model of a bridge.
Figure 3A:
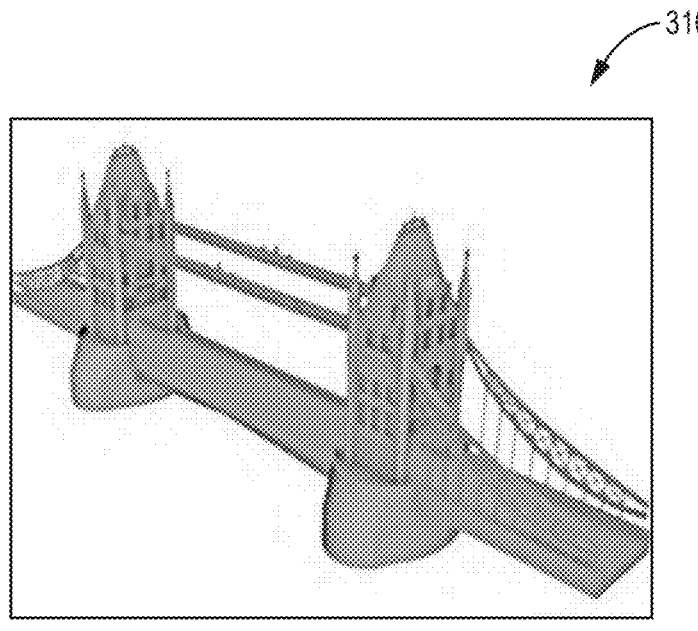

FIG. 3A is an example synthetic 2D render 310 of an example 3D infrastructure model of a bridge that may be generated as part of step 220.

In some embodiments, as part of step 220, in addition to rendering the 3D infrastructure model, the visualization application may also generate a background that may be shown behind the synthetic 2D render. The background may be generated by photogrammetry software (e.g., Context-Capture software) based on a set of 2D images by performing an automatic SfM and dense 3D reconstruction. Alternatively, the background may be obtained from another source.

Figure 3B:
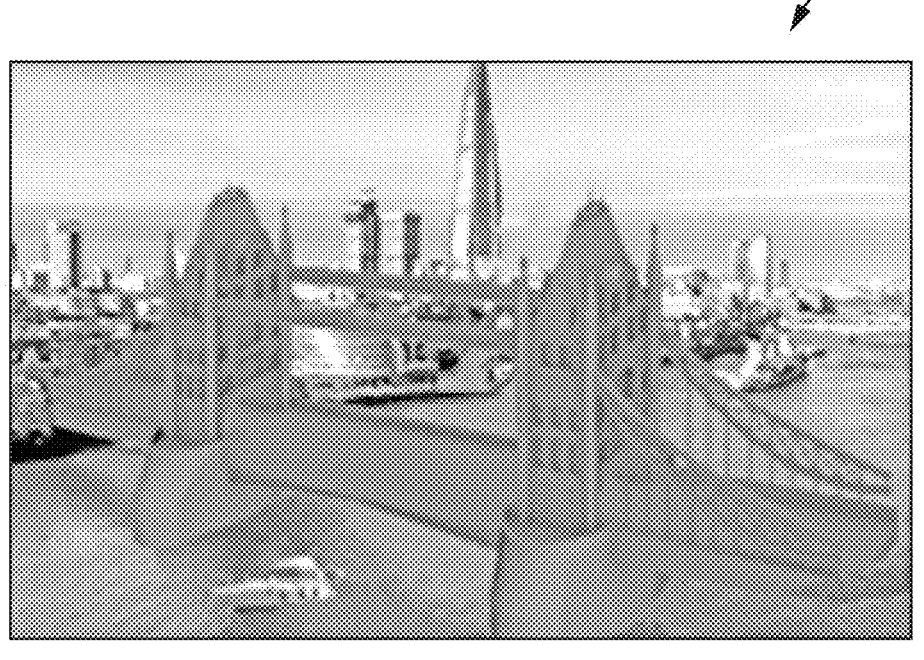
FIG. 3B is an example synthetic 2D render of an example 3D infrastructure model of a bridge including a photogrammetrically produced background.

FIG. 3B is an example synthetic 2D render 320 of an example 3D infrastructure model of a bridge including a photogrammetrically produced background that may be generated as part of step 220.

At step 230, the automatic style image retriever 140 of the visualization application 100 extracts a geographic position from the 3D infrastructure model and retrieves a set of style images that correspond to the geographic position of the 3D infrastructure model (e.g., are within a predetermined distance of the geographic position of the 3D infrastructure model) and show terrain, vegetation, structures, or other types of context. The style images may include 2D images (e.g., photographs) captured from the physical environment and geotagged with the geographic position of their capture. The style images may also include 2D images generated in other manners that are associated with a geographic position. For example, the style images may include rendered 2D images (e.g., rendered views of a 3D reality model) that are associated with a geographic position. The automatic style image retriever 140 may retrieve the style images from an existing image database. The existing image database may be an online database that includes images over a plurality of geographic regions, for example, the Google Images® database, Google Street View® database, Bing® Satellite Images database, etc.) and/or another source.

At optional, or alternative, step 232, the user interface 120 receives a selection of a set of user-provided style images (e.g., by receiving a selection of file names) corresponding to the geographic position. Similar to automatically retrieved style images, the user-provided style images may include 2D images (e.g., photographs) captured from the physical environment or other types of 2D images (e.g., rendered 2D images). However, rather than being retrieved from an existing image database, the user-provided style images may be specifically sourced by the user for the current operations.

Figure 3C:
FIG. 3C is an example of a set of style images that correspond to the geographic position of the example 3D infrastructure model of the bridge whose 2D synthetic render is shown in FIGS. 3A and 3B.
Figure 3C:
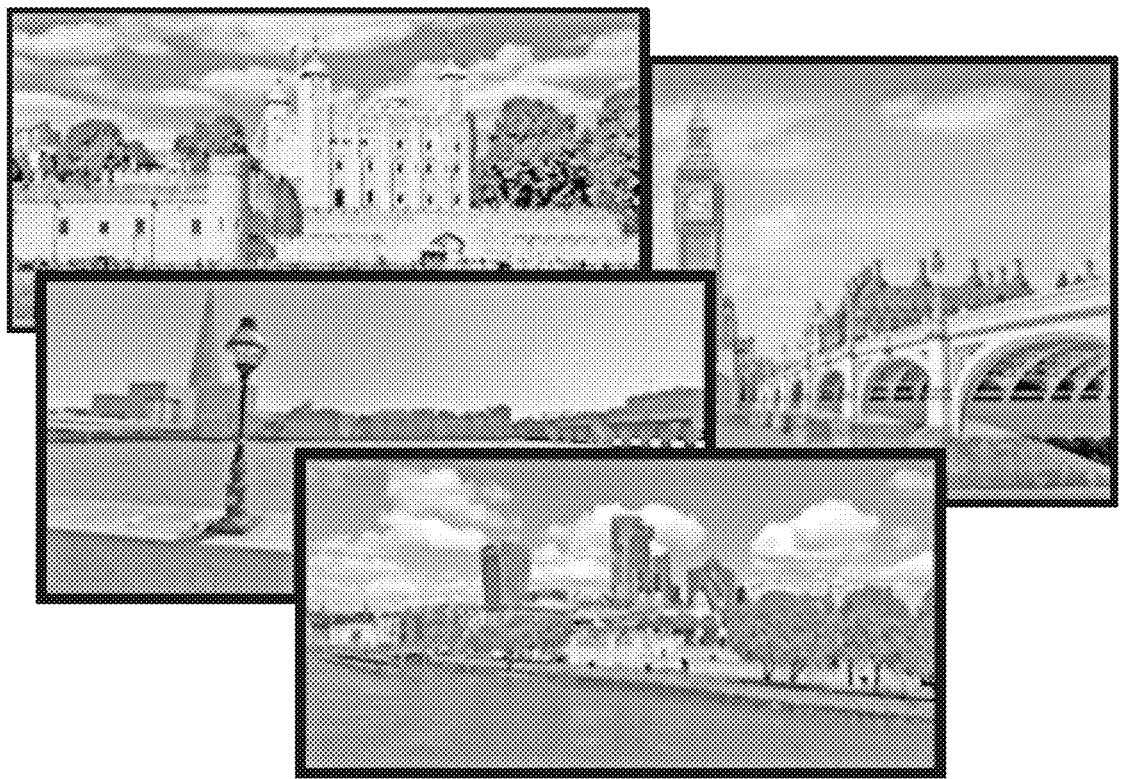

FIG. 3C is an example of a set of style images (e.g., automatically retrieved or user-provided) 330 that correspond to the geographic position of the example 3D infrastructure model of the bridge whose 2D synthetic render 310 is shown in FIGS. 3A and 3B, that may be retrieved/received as part of steps 230-232.

At optional step 240, the user interface 120 receives one or more text guidance phrases describing the desired visual appearance of the realistic 2D render. For example, a text guidance phrase may indicate desired features or context that should be used from the set of style images (e.g., "use red brick for the walls of the house", "show the house in bright daylight", etc.). Likewise, a text guidance phrase may indicate desired inclusion or exclusion of context (e.g., "show the bridge over the river", "exclude the boats from the river", etc.). It should be apparent that a wide variety of different types of text guidance phrases may be provided individually or in various combinations.

At optional step 250, the user interface 120 receives a selection of one or more mask images describing the desired visual appearance of the realistic 2D render. The mask images may indicate, for example, areas where visual appearance should be altered based on the set of style images, areas that should be entirely replaced based on the set of style images, areas where visual appearance should not be altered, and/or provide other types of guidance.

Figure 3D:
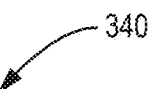
FIG. 3D is an example mask image that may be used with the 2D synthetic render of the example 3D infrastructure model of the bridge shown in FIGS. 3A and 3B.
Figure 3D:
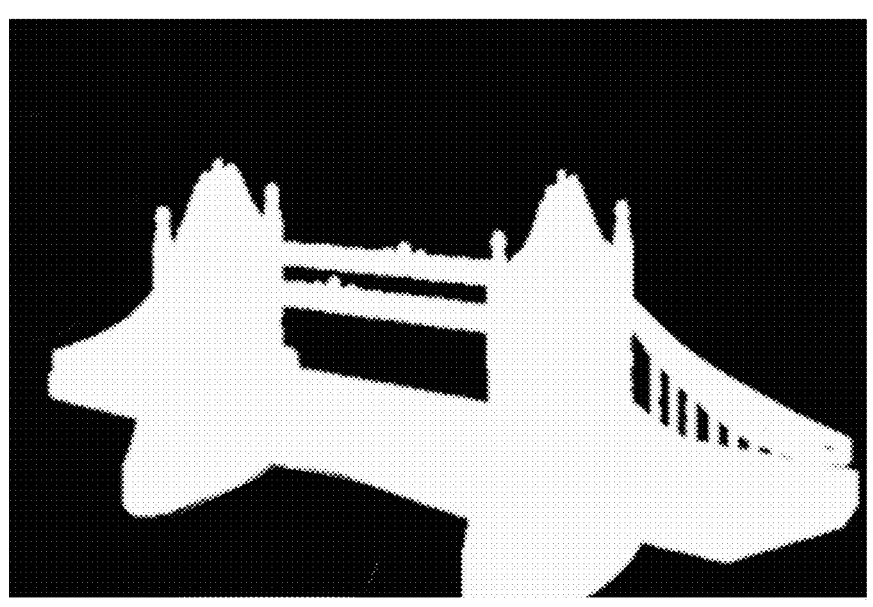

FIG. 3D is an example mask image 340 that may be used with the 2D synthetic render 310 of the example 3D infrastructure model of the bridge shown in FIGS. 3A and 3B. The example mask image 340 includes an area marked to show where the synthetic 2D render of the bridge is present and visual appearance should be altered based on the set of style images. Other areas (not shown) may indicate other information, such as where background is present and visual appearance should be altered based on the set of style images, or where an object is present in the background that should be completely ignored and replaced with different context from the set of style images.

At step 260, the realistic 2D render generator 150 of the visualization application 100 takes the automatically retrieved style images and/or the user provided style images, the synthetic 2D render, and, if present, the user-provided text guidance phrases and/or mask images and performs image translation to produce a realistic 2D render of the 3D infrastructure model. As discussed in more detail below, the realistic 2D render generator 150 may utilize a reverse diffusion ML model 155 and denoising ML model 160 that together effectively use the synthetic 2D render as a template and the set of style images as a pallet. Slight modifications may be allowed to the template but structural information is substantially preserved. The result may be adjustment of the visual appearance of the infrastructure itself and generation of realistic context based on what appears in the set of style images.

At step 270, the visualization application 100 outputs the realistic 2D render of the 3D infrastructure model. The realistic 2D render may be output by being displayed on a screen by the user interface 120, stored to memory, transmitted over a network, or otherwise provided. Where the output is stored or transmitted over a network, the realistic 2D render may be stored as an image file that may be consumed by another software application and ultimately used in the design or the construction of infrastructure in the physical world.

Figure 3E:
FIG. 3E is an example realistic 2D render of the example 3D infrastructure model of the bridge.
Figure 3E:

FIG. 3E is an example realistic 2D render 350 of the example 3D infrastructure model of the bridge that may be output as part of step 260 of FIG. 2. The visual appearance of the bridge from the synthetic 2D render has been adjusted to use natural-looking materials, textures, lighting parameters, atmospheric parameters, etc. from the set of style images. Realistic context has been added about the synthetic 2D render. Here the context is based on a modified background image, which has been altered and has had portions removed (e.g., a boat removed from the water).

Figure 4:
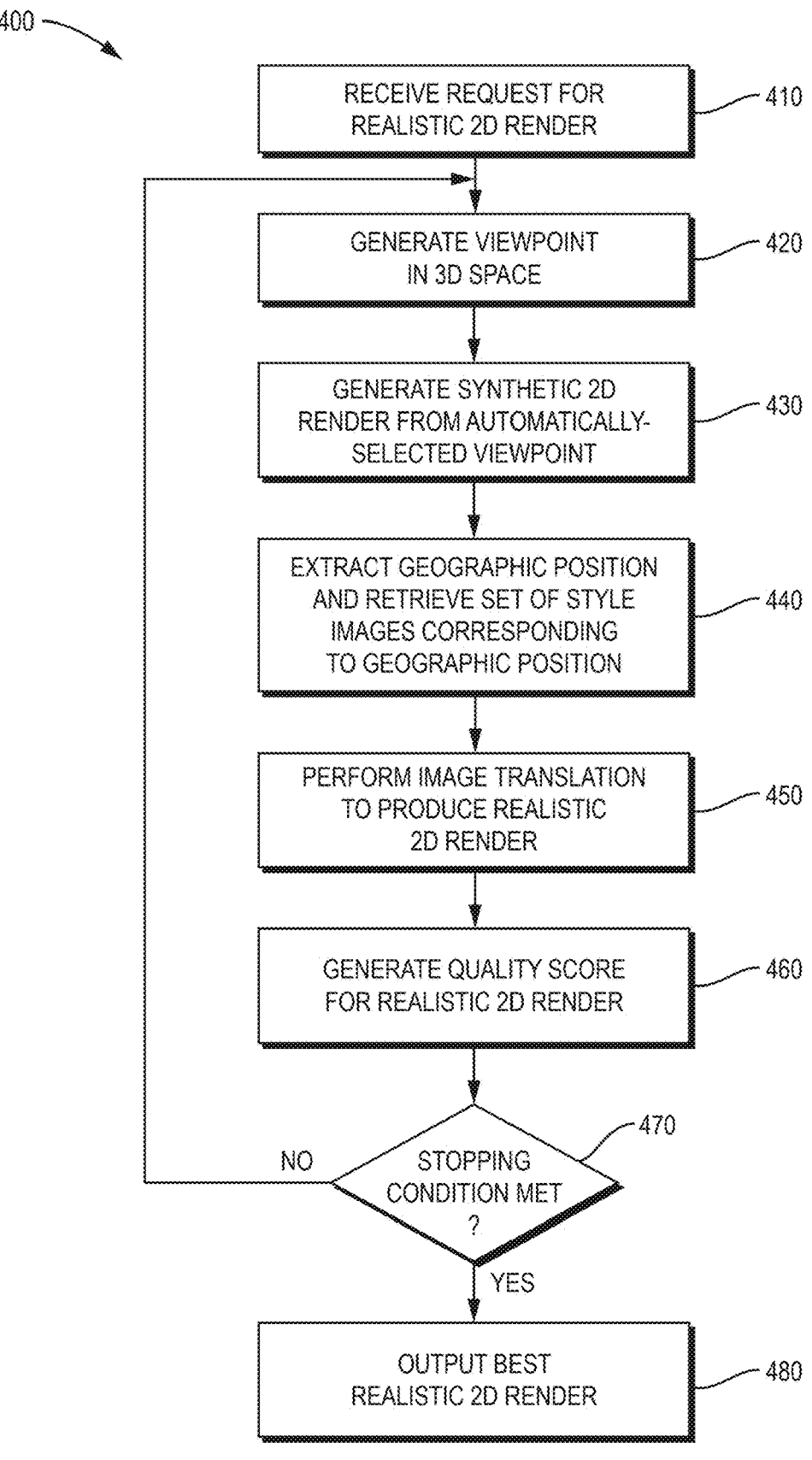
FIG. 4 is an alternative high-level sequence of steps that may be performed by the visualization application and its modules to generate a realistic 2D render of a 3D infrastructure model while further minimizing user input.

The user-directed workflow of FIG. 2 may be adapted in various ways. For example, a number of operations may be further automated to minimize user input (e.g., such that a realistic 2D render may be produced with a single button press). FIG. 4 is an alternative high-level sequence of steps 400 that may be performed by the visualization application 100 and its modules to generate a realistic 2D render of a 3D infrastructure model while further minimizing user input.

Where steps are performed in a similar manner to those in FIG. 2, details may be omitted.

At step 410, the user interface 120 of the visualization application 100 receives a request (e.g., a button press) to generate a realistic 2D render.

At step 420, the viewpoint selector 125 of the visualization application 100 generates a viewpoint in 3D space. In some implementations, the viewpoint may be randomly selected by a random viewpoint-selection algorithm. In some cases, random selection may be constrained by one or more parameters. For example, a parameter may require that the entire 3D infrastructure model is visible from the viewpoint, or that the viewpoint differs from any previously generated viewpoint by at least a minimum amount. In other implementations, one or more rules of a rule-based viewpoint-selection algorithm may perform the selection in a deterministic manner.

At step 430, the 3D viewer 130 of the visualization application 100 generates a synthetic 2D render of the 3D infrastructure model for the automatically-selected viewpoint. In some embodiments, as part of step 430, in addition to rendering the 3D infrastructure model, the visualization application may also generate a background that may be shown behind the synthetic 2D render (e.g., using photogrammetry software).

At step 440, the automatic style image retriever 140 of the visualization application 100 extracts a geographic position from the 3D infrastructure model and retrieves a set of style images that correspond to the geographic position of the 3D infrastructure model (e.g., are within a predetermined distance of the geographic position of the 3D infrastructure model). The automatic style image retriever 140 may retrieve the style images from an existing image database and/or another source.

At step 450, the realistic 2D render generator 150 of the visualization application 100 takes the automatically retrieved style images and the synthetic 2D render and performs image translation to produce a realistic 2D render of the 3D infrastructure model. Again, the realistic 2D render generator 150 may utilize a reverse diffusion ML model 155 and denoising ML model 160 that together effectively use the synthetic 2D render as a template and the set of style images as a pallet.

At step 460, the image quality discriminator 165 of the visualization application 100 generates a quality score indicating how visually pleasing the realistic 2D render appears. A realistic 2D render may be considered visually pleasing based on a number of factors, including how natural or artificial the render appears, the size and perspective of the infrastructure in the render, and the amount and composition of context, among others. The image quality discriminator 165 may employ a ML model trained upon a set of images that are considered to be visually pleasing and visually displeasing to assign the quality score.

At step 470, the visualization application 100 checks whether a stopping condition has been met. In one embodiment, the stopping condition is a number of iterations reaching a threshold. Alternatively, the stopping condition may be the quality score exceeding a threshold. If the stopping has not been met, execution may loop to step 420. If the stopping condition has been met, execution may proceed to step 480.

At step 480, the visualization application 100 outputs at least the best realistic 2D render of the 3D infrastructure model (i.e. the realistic 2D render having the greatest quality score). The realistic 2D render may be output by being displayed on a screen by the user interface 120, stored to memory, transmitted over a network, or otherwise provided.

Figure 5:
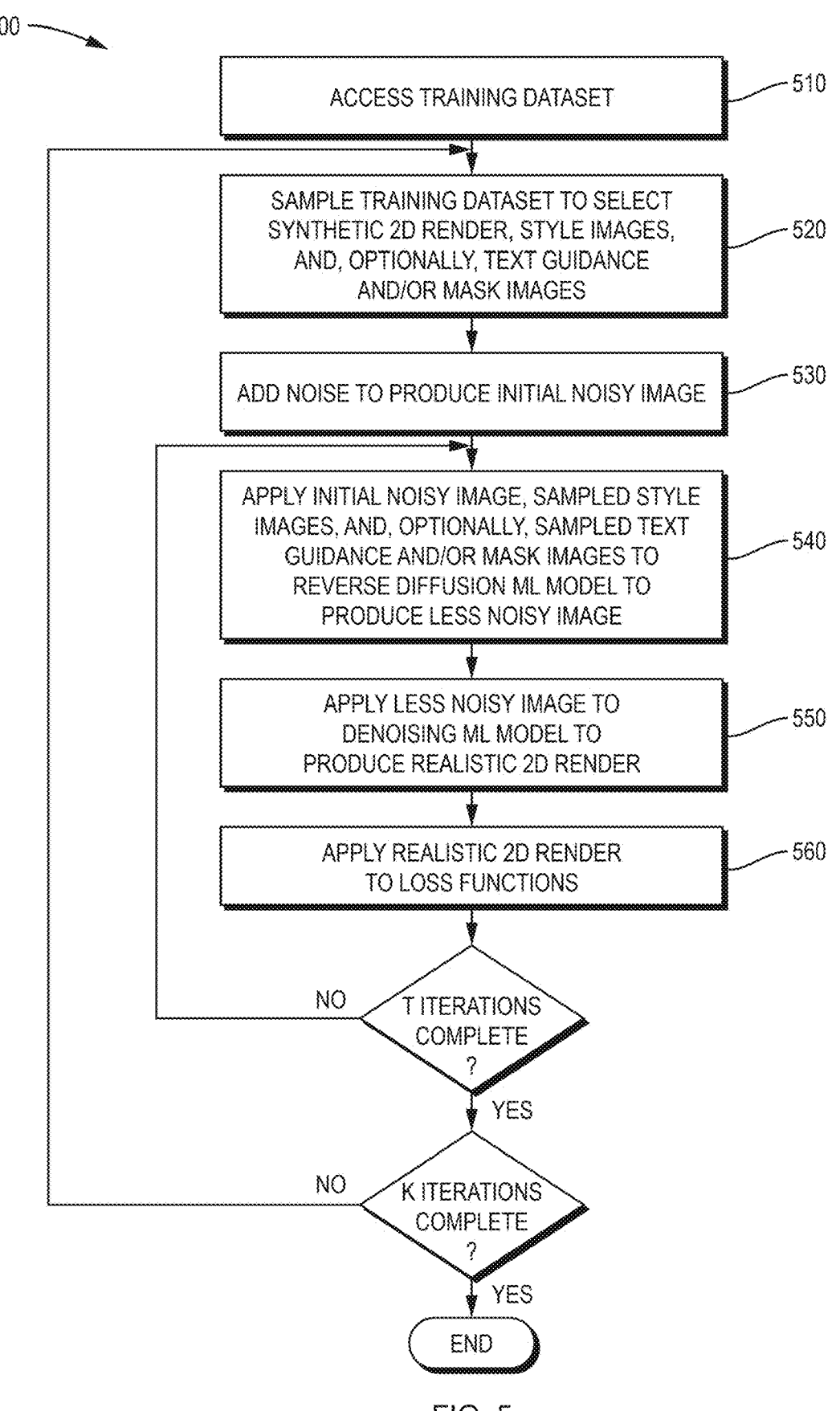
FIG. 5 is a flow diagram of an example sequence of steps for training a diffusion ML model and denoising ML model of a realistic 2D render generator to generate a realistic 2D render of a 3D infrastructure model.

Looking to the realistic 2D render generator 150 in more detail, prior to being used in inference in the high-level sequences of steps 200, 400 discussed above, the diffusion ML model 155 and denoising ML model 160 should be trained. FIG. 5 is a flow diagram of an example sequence of steps 500 for training a diffusion ML model 155 and denoising ML model 160 of a realistic 2D render generator 150 to generate a realistic 2D render of a 3D infrastructure model. The steps 500 may be performed by a separate training framework (not shown) and/or portions of the visualization application 100.

At step 510, a training dataset is accessed. The training dataset includes a number of synthetic 2D renders of 3D infrastructure models, style images and, optionally, text guidance phrases and/or mask images.

At step 520, the training dataset is sampled using a sampling algorithm (e.g., a random sampling algorithm, a cluster sampling algorithm, a systematic sampling algorithm, etc.) to select a synthetic 2D render of a 3D infrastructure model, a set of one or more style images, and, optionally, one or more text guidance and/or mask images.

At step 530, gaussian noise is added to each pixel of the sampled synthetic 2D render to produce an initial noisy image. The goal here is to corrupt the training data.

At step 540, the initial noisy image, along with the sampled set of style images, and, optionally, the sampled text guidance and/or mask images are applied to the reverse diffusion ML model 155 to produce a less noisy image. The reverse diffusion ML model 155 attempts to recover the original information by reversing the noising (i.e. reversing the process that transforms data into noise). The less noisy image may have many channels (e.g., more than the 3 channels of a typical red-green-blue (RGB) color space) that each include information for each pixel.

At step 550, the less noisy image is applied to the denoising ML model 160 that remove remaining noise and reduces the number of channels (e.g., reduces the number of channels to 3 RGB channels) to produce a realistic 2D render of the 3D infrastructure model.

At step 560, the realistic 2D render of the 3D infrastructure model is applied in parallel to a plurality of loss functions that evaluate specific criterion, including a structural similarity criterion function, a style criterion function, and if text guidance phrases are optionally present in the training dataset, a text criterion function. The loss from each loss function are combined (e.g., numerically added) and the combined loss backpropagated (e.g., using gradient decent) to modify the weights of the reverse diffusion ML model 155 and the denoising ML model 160.

The structural similarity criterion function attempts to ensure that the structural information of the synthetic render of the 3D infrastructure model is preserved, such that structure of the infrastructure is not substantially altered as visual appearance is adjusted. In one embodiment, the structural similarity criterion function is computed by a pretrained ML model (e.g., a pretrained convolutional neural network (CNN)) that receives the sampled synthetic 2D render and the realistic 2D render. If structure is preserved, the difference in outputs of the deeper hidden layers of the ML model should be numerically similar. For example, if a pretrained vision transformer is used as the ML model, features of a plurality of patches of the synthetic 2D render and the realistic 2D render should be numerically similar.

The style criterion function attempts to ensure that the style of the realistic 2D render replicates the style of the sampled set of style images, including both the visual appearance of the infrastructure itself and the context surrounding the infrastructure. In one embodiment, the style criterion function is computed by a pretrained ML model (e.g., a pretrained CNN). If style is similar, a token value produced by the pretrained ML model for the realistic 2D render should be numerically similar to a token value produced by the pretrained ML model for the sampled set of style images. For example, if a pretrained vision transformer is used as the ML model, a classify (CLS) token produced by the pretrained vision transformer for the realistic 2D render and for the sampled set of style images should be numerically similar.

The text criterion function attempts to ensure that the realistic 2D render conforms to the sampled text guidance phrases. In one embodiment, the text criterion function is computed by a pair of pretrained ML models (e.g., pretrained CNNs). A first pretrained ML model converts the sampled text guidance phrases to a first numerical vector. A second pretrained ML model converts the realistic 2D render to a second numerical vector. A sum of the absolute difference between both vectors may be used as the loss. In one specific implementation, the pretrained ML models may be Contrastive Language-Image Pretraining (CLIP) models.

At step 570, execution loops back to step 540, to repeat operations for a number of iterations (e.g. T iterations, where T=1000) to progressively refine the same initial noisy image, using the same sampled set of style images, and, optionally, the sampled text guidance and/or mask images.

Likewise, at step 580, execution loops back to step 520 to repeat operations for a number of iterations (e.g. K iterations) for different sampling, to use a different initial noisy image, sampled set of style images, and, optionally, the sampled text guidance and/or mask images. The number of iteration (K) may be statically or dynamically chosen (e.g., iterations may continue to until the combined loss reaches a given threshold). Upon completion, the now-trained diffusion ML model 155 and denoising ML model 160 may be used in inference.

FIG. 6 is a flow diagram of an example sequence of steps 600 for using a trained reverse diffusion ML model 155 and denoising ML model 160 of the realistic 2D render generator 150 in inference to generate a realistic 2D render of a 3D infrastructure model. The steps 600 may be performed as part of the high-level sequences of steps 200, 400 discussed above.

At step 610, the visualization application 100 accesses a synthetic 2D render of a 3D infrastructure model from the 3D viewer 130, and a set of one or more style images, and, optionally, one or more text guidance and/or mask images indicated in the user interface 120.

At step 620, the visualization application 100 adds gaussian noise to each pixel of the synthetic 2D render to produce an initial noisy image.

At step 630, the initial noisy image, along with the set of style images, and, optionally, the sampled text guidance and/or mask images are applied to the trained reverse diffusion ML model 155 to produce a less noisy image. The trained reverse diffusion ML model 155 attempts to recover the original information by reversing the noising. Again, the less noisy image may have many channels that each include information for each pixel. Execution loops at step 620 to repeat operations for a number of iterations (e.g. T iterations, where T=1000) to progressively refine the initial noisy image At step 640, the less noisy image is applied to the trained denoising ML model 160 that removes remaining noise and reduces the number of channels to produce a realistic 2D render of the 3D infrastructure model.

The above discussed techniques for using geographically relevant style images as guidance to automatically generate realistic 2D renders of a 3D infrastructure model may be extended in a number of different ways to provide alternative or additional capabilities. In one extension, realistic 2D renders produced using the techniques may be used to as a basis for assigning materials and/or textures to elements of a 3D infrastructure model itself. As discussed above, indications of materials and/or textures are often absent or incomplete in element metadata, and even if they are present, may be artificial, following simple conventions or chosen for purposes of contrast or information presentation. The techniques may be extended to refine element metadata to add missing or replace initial materials and/or textures with realistic ones derived from realistic 2D renders.

FIG. 7 is a high-level sequence of steps 700 that may be performed by the visualization application 100 and its modules to assign materials and/or textures to elements of a 3D infrastructure model based on geographically relevant style images.

At step 710, the user interface 120 of the viewpoint selector 125 receives a request (e.g., a button press) to determine realistic materials and/or textures for elements of a 3D infrastructure model.

At step 720, the viewpoint selector 125 of the visualization application 100 generates a viewpoint in 3D space. The viewpoint may be randomly selected by a random viewpoint selection algorithm. Alternatively, the viewpoint may be selected to target specific elements that still require determination of realistic materials and/or textures, by imposing constraints on random selection or by using a rule-based viewpoint selection algorithm that selects viewpoints in a deterministic manner. The visualization application 100 may maintain a list of elements for which realistic materials and/or textures have not yet been determined. On an initial iteration, this list may include all elements of the 3D infrastructure model. The viewpoint selector 125 may use a geometric optimization algorithm to select a viewpoint that minimizes occlusion for the largest number of elements on the list of elements for which realistic materials and/or textures have not yet been determined.

At step 730, the 3D viewer 130 of the visualization application 100 generates a synthetic 2D render of the 3D infrastructure model for the selected viewpoint.

At step 740, the 2D render to element mapper 170 of the visualization application 100 uses the viewpoint from the viewpoint selector 125 and projection geometry to generate a location map that relates each pixel in the synthetic 2D render to the element from which it was generated in the 3D infrastructure model.

At step 750, the automatic style image retriever 140 of the visualization application 100 extracts a geographic position from the 3D infrastructure model and retrieves a set of style images that correspond to the geographic position of the 3D infrastructure model (e.g., are within a predetermined distance of the geographic position of the 3D infrastructure model). The automatic style image retriever 140 may retrieve the style images from an existing image database and/or another source.

At step 760, the realistic 2D render generator 150 of the visualization application 100 takes the automatically retrieved style images and the synthetic 2D render and performs image translation to produce a realistic 2D render of the 3D infrastructure model. The realistic 2D render generator 150 may utilize a reverse diffusion ML model 155 and denoising ML model 160 that together effectively use the synthetic 2D render as a template and the set of style images as a pallet. For this extension, the realistic 2D render generator 150 may omit context when producing the realistic 2D render, as such context may not contribute to materials and/or textures for elements.

At step 770, a material and/or texture determiner 175 determines materials and/or textures for each element visible from the viewpoint based on the realistic 2D render and the location map, and stores them in a temporary database. In one embodiment, for each element, the material and/or texture determiner 175 selects one or more groups of pixels from locations in that realistic 2D render indicated by the location map to relate to the element. For each group of pixels related to the element, the material and/or texture determiner 175 searches for periodically repeating patterns. Once periodicity of a pattern is determined, the material and/or texture determiner 175 identifies individual unit cells. When there are multiple visible unit cell, they may be combined (e.g., averaged). The material and/or texture determiner 175 may extract a material based on the combined unit cell and combine this material determination (e.g., via a global optimization) with any material determinations from previous iterations. Likewise, the material and/or texture determiner 175 may extract a texture based on the pattern of the combined unit cell and combine this texture determination with any material determinations from previous iterations (e.g., by utilizing the mean, median, etc.). If available, metadata for the element may also be used (e.g., a material or texture that coincides with the metadata may be given a greater weight).

In an alternative embodiment, rather than derive the material and/or texture for an element directly from the realistic 2D render, the material and/or texture determiner 175 may use the realistic 2D render to select the material and/or texture from a library of established material and texture couples. Each material and texture couples may be applied by the 3D viewer 130 to the element resulting in synthetic images of the element. The synthetic images of the element are then compared by the material and/or texture determiner 175 to pixels of the element in that realistic 2D render indicated by the location map be related to the element, and a similarity score calculated. If available, metadata for the element may also be used in the assignment of similarity score (e.g., a couple with a material or texture that coincides with the metadata may be assigned a greater similarity score). The material and texture couple having the greatest similarity score is selected, and the material and/or texture from that couple used for the element.

At step 780, the 3D infrastructure model updater 180 of the visualization application 100 determines if a stopping condition has been met. In one implementation, the stopping condition is that realistic materials and/or textures have been determined for a number of (e.g., all) potentially-visible elements of the 3D infrastructure model. Elements that are permanently occluded by other elements from all possible viewpoints may be ignored. If the stopping condition has not been met, execution loops back to step 720, the viewpoint selector 125 of the visualization application 100 generate another viewpoint to capture additional elements, and operations repeat. If it has been met, execution proceeds to step 790.

At step 790, the 3D infrastructure model updater 180 updates the 3D infrastructure model based on the determined materials and/or textures. The 3D infrastructure model updater 180 adds missing or replaces initial materials and/or textures in the element metadata with realistic ones stored in the temporary database. Thereafter the 3D infrastructure model may be rendered and displayed on a screen, stored to memory, transmitted over a network, or otherwise output.

In summary, the above description describes example techniques for using geographically relevant style images as guidance to automatically generate realistic 2D renders of a 3D infrastructure model, and extensions of such techniques. It should be understood that additional extensions, adaptations, modifications, and the like may be readily made to improve the described capabilities or to provide additional capabilities.

While it is described above that functionality may be implemented in a specific manner by software on specific hardware, it should be understood that the functionality may also be implemented in different manners by different software on different hardware. Software may include instructions in a high-level programming language or low-level programming language that may be stored and compiled or interpreted to run on hardware. For example, instructions may be stored on a non-transitory electronic device readable medium and when executed on one or more processors is operable to implement the functionality.

It should be understood that the ordering of any method steps discussed above may be changed to suit various situations or requirements. Absent an explicit indication to the contrary, the order of steps described above may be modified such that a subsequent step occurs before a preceding step, or in parallel to such step.

Above all, it should be understood that the above descriptions are meant to be taken only by way of example.

What is claimed is:

1. A method for generating a realistic two-dimensional (2D) render of a three-dimensional (3D) infrastructure model, comprising:

receiving, by a visualization application executing on one or more computing devices, a request to generate the realistic 2D render of the 3D infrastructure model;

determining, by the visualization application, a viewpoint in 3D space of the 3D infrastructure model;

generating, by the visualization application, a synthetic 2D render of the 3D infrastructure model from the viewpoint;

determining, by the visualization application, a geographic position for the 3D infrastructure model;

retrieving, by the visualization application, a set of style images corresponding to the geographic position that show terrain, vegetation, and/or structures;

performing, by the visualization application, image translation to adjust visual appearance of infrastructure in the synthetic 2D render based on visual appearance of the set of style images and to generate realistic context based on what appears in the set of style images to produce the realistic 2D render; and outputting, by the visualization application, the realistic 2D render.

2. The method of claim 1, wherein the retrieving retrieves the set of style images from an online image database that includes images over a plurality of geographic regions.

3. The method of claim 1, further comprising:

receiving selection of a set of user-provided style images, wherein the performing image translation also adjusts visual appearance of infrastructure in the synthetic 2D render and generates realistic context based on the set of user-provided style images.

4. The method of claim 1, further comprising:

receiving one or more user-provided text guidance phrases, wherein the performing image translation also adjusts visual appearance of infrastructure in the synthetic 2D render and generates realistic context based on the one or more user-provided text guidance phrases.

5. The method of claim 1, further comprising:

receiving, by the visualization application, selection of one or more mask images, wherein the performing image translation also adjusts visual appearance of infrastructure in the synthetic 2D render and generates realistic context based on the one or more mask images.

6. The method of claim 1, wherein the determining the viewpoint further comprises:

receiving a selection of the viewpoint from a user.

7. The method of claim 1, wherein the determining the viewpoint further comprises:

generating the viewpoint using a random viewpoint-selection algorithm or a rule-based viewpoint-selection algorithm, and wherein the method further comprises:

repeating at least the generating the viewpoint, the generating the synthetic 2D render, and the performing image translation until a stopping condition is met.

8. The method of claim 1, wherein the image translation is performed by a trained reverse diffusion machine learning (ML) model and a trained denoising ML model.

9. The method of claim 8, wherein the performing image translation further comprises:

applying noise to each pixel of the synthetic 2D render to produce an initial noisy image;

applying the initial noisy image and the set of style images to the trained reverse diffusion ML model to produce a less noisy image; and applying the less noisy image to the trained denoising ML model to produce the realistic 2D render.

10. The method of claim 1, further comprising:

generating a location map that relates pixels in the synthetic 2D render to elements from which they were generated in the 3D infrastructure model;

determining realistic materials and/or textures for one or more elements of the 3D infrastructure model visible from the viewpoint based on the realistic 2D render and the location map; and updating the 3D infrastructure model to add missing or replace initial materials and/or textures of the one or more elements with the realistic materials and/or textures.

11. A non-transitory computing device readable medium having instructions stored thereon, the instructions when executed by one or more computing devices operable to:

receive a request to generate a realistic two-dimensional (2D) render of a three-dimensional (3D) infrastructure model;

determine a viewpoint in 3D space of the 3D infrastructure model;

generate a synthetic 2D render of the 3D infrastructure model from the viewpoint;

obtain a set of style images that show terrain, vegetation, and/or structures;

perform image translation to adjust visual appearance of infrastructure in the synthetic 2D render based on visual appearance of the set of style images and to generate realistic context based on what appears in the set of style images to produce the realistic 2D render; and output the realistic 2D render.

12. The non-transitory electronic-device readable medium of claim 11, wherein the instructions to obtain the set of style images comprise instructions that when executed are operable to:

retrieve the set of style images from an online image database that includes images over a plurality of geographic regions based on a geographic position for the 3D infrastructure model.

13. The non-transitory electronic-device readable medium of claim 11, wherein the instructions to obtain the set of style images comprise instructions that when executed are operable to:

receive a selection of user-provided style images.

14. The non-transitory electronic-device readable medium of claim 11, wherein the instructions when executed are further operable to:

receive one or more user-provided text guidance phrases, wherein the instructions operable to perform image translation are operable to adjust visual appearance of infrastructure in the synthetic 2D render and generate realistic context based on the one or more user-provided text guidance phrases.

15. The non-transitory electronic-device readable medium of claim 11, wherein the instructions to determine the viewpoint comprise instructions that when executed are operable to:

receive a selection of the viewpoint from a user.

16. The non-transitory electronic-device readable medium of claim 11, wherein the instructions to determine the viewpoint comprise instructions that when executed are operable to:

generate the viewpoint using a random viewpoint-selection algorithm or a rule-based viewpoint-selection algorithm.

17. The non-transitory electronic-device readable medium of claim 11, wherein the instructions to perform image translation comprise instructions that when executed are operable to:

apply noise to each pixel of the synthetic 2D render to produce an initial noisy image;

apply the initial noisy image and the set of style images to a trained reverse diffusion machine learning (ML) model to produce a less noisy image; and apply the less noisy image to a trained denoising ML model to produce the realistic 2D render.

18. A method for assigning materials and/or textures to elements of a three-dimensional (3D) infrastructure model, comprising:

receiving, by an application executing on one or more computing devices, a request to determine realistic materials and/or textures of the 3D infrastructure model;

determining, by the application, a viewpoint in 3D space of the 3D infrastructure model;

generating, by the application, a synthetic 2D render of the 3D infrastructure model from the viewpoint;

generating, by the application, a location map that relates pixels in the synthetic 2D render to elements from which they were generated in the 3D infrastructure model;

obtaining, by the application, a set of style images that show terrain, vegetation, and/or structures;

performing, by the application, image translation to adjust visual appearance of infrastructure in the synthetic 2D render based on visual appearance of the set of style images based on what appears in the set of style images to produce the realistic 2D render;

determining, by the application, realistic materials and/or textures for one or more elements of the 3D infrastructure model visible from the viewpoint based on the realistic 2D render and the location map; and updating, by the application, the 3D infrastructure model to add missing or replace initial materials and/or textures with the realistic materials and/or textures.

19. The method of claim 18, wherein the obtaining the set of style images further comprises:

retrieving the set of style images from an online image database that includes images over a plurality of geographic regions based on a geographic position for the 3D infrastructure model.

20. The method of claim 18, wherein the obtaining the set of style images further comprises:

receiving a selection of user-provided style images.

21. The method of claim 18, wherein the determining the viewpoint further comprises:

generating the viewpoint using a random viewpoint-selection algorithm or a rule-based viewpoint-selection algorithm, and wherein the method further comprises:

repeating at least the generating the viewpoint, the generating the synthetic 2D render, the performing image translation, the determining realistic materials and/or textures, and the checking whether realistic materials and/or textures have been determined until a stopping condition is met.

22. The method of claim 18, wherein the image translation is performed by a trained reverse diffusion machine learning (ML) model and a trained denoising ML model.

23. The method of claim 22, wherein the performing image translation further comprises:

applying noise to each pixel of the synthetic 2D render to produce an initial noisy image;

applying the initial noisy image and the set of style images to the trained reverse diffusion ML model to produce a less noisy image; and applying the less noisy image to the trained denoising ML model to produce the realistic 2D render.

\* \* \* \* \*